United States Patent [19]

Hashimoto

[11] 4,178,720
[45] Dec. 18, 1979

[54] DEVICE FOR FABRICATING AXIALLY SYMMETRIC ASPHERICS

[75] Inventor: Hiroshi Hashimoto, Tokyo, Japan

[73] Assignee: Nippon Kogaku K. K., Tokyo, Japan

[21] Appl. No.: 872,032

[22] Filed: Jan. 25, 1978

[30] Foreign Application Priority Data

Jan. 27, 1977 [JP] Japan .................................. 52-7231

[51] Int. Cl.² ............................................. B24B 13/00
[52] U.S. Cl. .................................................. 51/124 L
[58] Field of Search ............... 51/97 R, 124 R, 124 L, 51/165.71, 165.77, 165.92, 97 NC, 56

[56] References Cited

U.S. PATENT DOCUMENTS

| Re. 14,751 | 11/1919 | Brockbank | 51/56 |
| 2,955,390 | 10/1960 | Phillips | 51/124 L |
| 2,975,565 | 3/1961 | Phillips | 51/124 L |
| 3,694,970 | 10/1972 | Schoonover et al. | 51/165.71 |
| 3,848,368 | 11/1974 | Toshioka et al. | 51/106 R X |
| 3,913,274 | 10/1975 | Raiford et al. | 51/165.71 X |
| 4,132,036 | 1/1979 | Doi et al. | 51/124 L |

FOREIGN PATENT DOCUMENTS

1387113 3/1975 United Kingdom .................. 51/101 R
384656 10/1973 U.S.S.R. ................................ 51/124 L

*Primary Examiner*—Harold D. Whitehead
*Assistant Examiner*—Robert P. Olszewski
*Attorney, Agent, or Firm*—Shapiro and Shapiro

[57] ABSTRACT

In a device for fabricating axially symmetric aspherics in which a workspindle for rotating a workpiece about a first axis is swung within a predetermined angle about a second axis orthogonal to the first axis and a grinding wheel for grinding the workpiece is displaced by a predetermined amount in a direction orthogonal to the second axis, there is provided means for continuously detecting the angle of swing about the second axis of the workspindle, drive means for displacing the grinding wheel, means for continuously measuring the grinding position of the grinding wheel, and means for pre-memorizing, in accordance with the angle of swing, a predetermined position of each point on the predetermined aspherics to be ground and for controlling the drive means so that the grinding position measured by the measuring means is equal to the memorized predetermined position.

7 Claims, 2 Drawing Figures

DEVICE FOR FABRICATING AXIALLY SYMMETRIC ASPHERICS

BACKGROUND OF THE INVENTION

1. Field of the Invention

This invention relates to a device for fabricating axially symmetric aspherics.

2. Description of the Prior Art

In the prior art devices for fabricating axially symmetric aspherics, a cam for causing a workspindle having a workpiece mounted on one end thereof to swing through a predetemined angle of rotation about the axis thereof and for causing similar rotation of the workpiece has been secured on the rotary shaft of the workspindle with their axes of symmetry being coincident, and reciprocal rectilinear movement provided by a cam follower engaged with the cam has been reduced in amount and transmitted to a tool holding a grinding wheel for machining the workpiece, whereby predetermined aspherics have been facricated in accordance with the amount of lift corresponding to the angle of rotation of the cam. Such prior art devices, however, have suffered from profile errors attributable to the wear of the cam during its manufacture and during its operation and mechanical errors such as cam mounting errors or the like and moreover, these errors have been difficult to correct.

SUMMARY OF THE INVENTION

It is an object of the present invention to overcome the above-noted disadvantages and to provide a device for fabricating aspheric lenses in which the above-mentioned errors are prevented from occurring and which enables ultra-high machining precision.

The device of the present invention comprises means for causing a workspindle holding a workpiece and rotatable about a first axis to swing within a predetermined angle about a second axis orthogonal to said first axis, drive means for displacing a workpiece grinding wheel in a direction orthogonal to said second axis within a range permitting the grinding, means for continuously detecting the angle of rotation, means for continuously measuring the grinding position of the grinding wheel, and means for pre-memorizing, in accordance with said angle of swing, a predetermined position of each point on the predetermined aspherics to be ground and for controlling the drive means so that the grinding position measured by the measuring means is equal to the memorized predetermined position.

The invention will become fully apparent from the following detailed description thereof taken in conjunction with the accompanying drawings.

DESCRIPTION OF THE PREFERRED EMBODIMENTS

Figure 1:
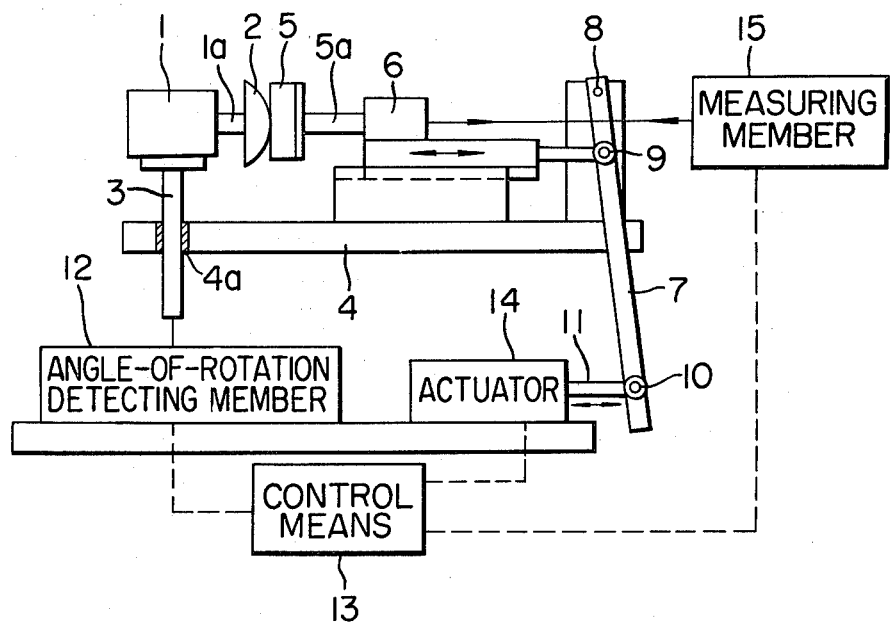
FIG. 1 is a schematic side view of an embodiment of the present invention.

An embodiment of the present invention will hereinafter be described in detail. In FIG. 1, a workpiece mounting member 1 has a rotary shaft 1a of variable length mounted thereon for rotation by a motor, not shown, and one end of the rotary shaft 1a is formed so as to permit a workpiece 2 to be mounted thereon. A swinging center shaft 3 orthogonal to the rotary shaft 1a has the workpiece mounting member 1 secured to one end thereof, and is rotatably mounted on a device body 4 through a sleeve 4a. The center shaft 3 is reciprocally rotatable within a predetermined angle of rotation by a drive source, not shown, so as to cause the workpiece mounting member 1 to swing within the range of grinding condition of a grinding wheel 5 which is to be described. The grinding wheel 5 is mounted in place on a carriage 6, which is to be described, and rotatable about a shaft 5a by a motor, not shown. The carriage 6 is mounted for sliding movement in the direction of the adjacent double-headed arrow orthogonal to the swinging center shaft 3. A reducing lever 7 is pivotally supported at one end on the device body by means of a pivot pin 8, and rotatably supports at an intermediate portion thereof a rotatable roller 9 engaged with one end of the carriage 6, and rotatably supports at the other end a roller 10 engaged with an interlocking member 11 slidable in the direction of the adjacent double-headed arrow in response to movement of an actuator 14 which will further be described. The reducing lever 7, pivot pin 8, rollers 9 and 10 together constitute reducing means for reducing the amount of displacement imparted by the actuator 14 and for transmitting such reduced amount of displacement to the carriage 6. An angle-of-rotation detecting member 12 such as a rotary encoder or the like is provided to continuously measure the momentary angle of rotation of the center shaft 3 during its predetermined angle of reciprocal rotation and to convert the detected data into an electrical signal and transmit such signal to control means 13 which is to be described. The actuator 14 may be driven by a pulse motor so as to impart rectilinear reciprocal movement to the interlocking member 11 upon receipt of a pulse signal. A measuring member 15 such as a laser interference measuring device is provided to measure the grinding position of the grinding wheel 5 at all times and also to transmit the measured data to the control means 13.

Figure 2:
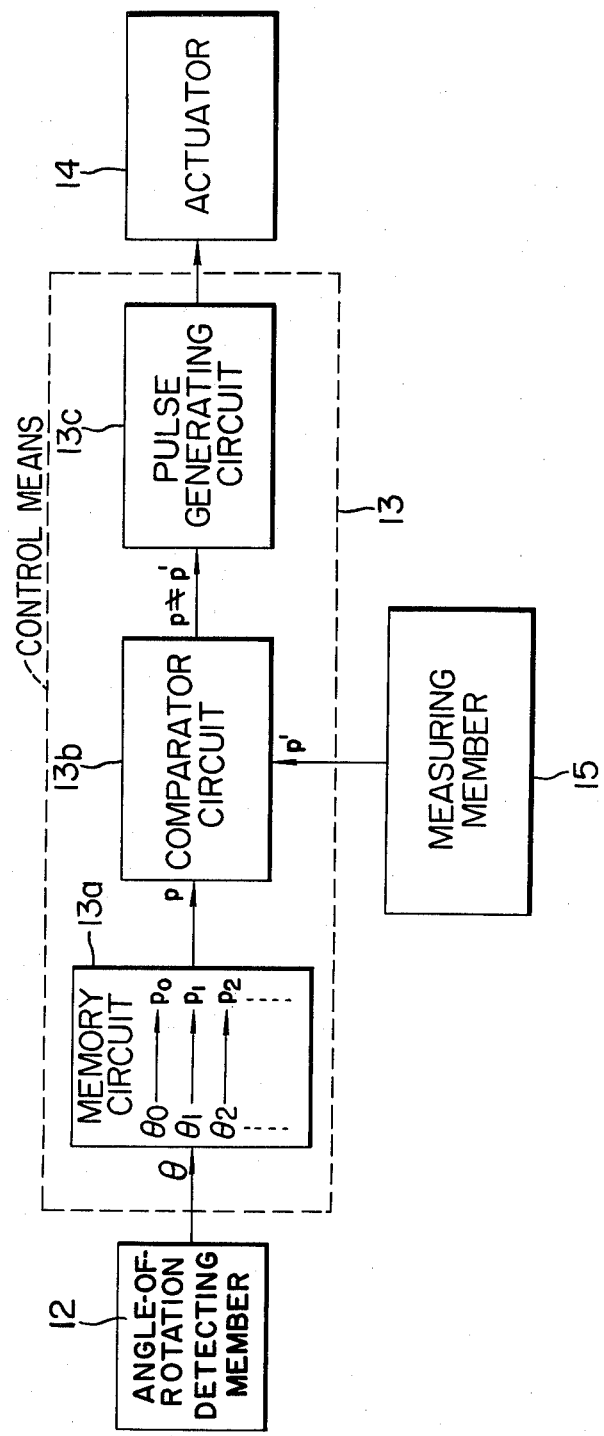
FIG. 2 is a block diagram of a control mechanism in the device of the present invention.

The control means 13 may be a computer or the like and, as shown in FIG. 2, comprises a memory circuit 13a connected to the angle-of-rotation detecting member 12, a comparator circuit 13b connected to the memory circuit and to the measuring member 15, and a pulse generating circuit 13c connected to the comparator circuit. The control means 13 is connected to the actuator 14.

The memory circuit 13a pre-memorizes predetermined grinding positions $p_0, p_1, p_2, \ldots$ of the grinding wheel 5 in which the workpiece 2 is to be ground to a predetermined aspheric configuration when the center shaft 3 is at angles of rotation $\theta_0, \theta_1, \theta_2, \ldots$, and when data relating to the angle of rotation $\theta$ is transmitted thereto from the angle-of-rotation detecting member 12, the memory circuit sends to the comparator circuit 13b the information on the predetermined grinding position p corresponding to said data.

The comparator circuit 13b compares the predetermined grinding position p sent from the memory circuit 13a with the measured grinding position value p' of the grinding wheel transmitted from the measuring member 15 and, whenever there is a difference between the two positions, the comparator circuit sends to the pulse generating circuit 13c an electrical signal having a value corresponding to the difference. The pulse generating circuit 13c generates the number of pulse signals corresponding to the amount of the electrical signal sent from the comparator circuit 13b.

With such a construction, fabrication of an axially symmetric aspheric lens or the like may be accomplished by adjusting the length of the rotary shaft 1a to obtain a predetermined referential radius of the aspherics, rotating the rotary shaft 1a and the workpiece 2 about the axis of this shaft while swinging the workpiece 2 and the workpiece mounting member, through a predetermined angle of rotation about the center shaft 3, and rotating the grinding wheel 5 about the shaft 5a to grind the workpiece 2. At the same time, the angle of rotation of the center shaft 3 and the amount of displacement of the grinding wheel 5 are continuously measured by the angle-of-rotation detecting member 12 and the measuring member 15, respectively, and these data are transmitted to the control means 13. The control means 13 compares the predetermined amount of displacement of the grinding wheel 5 corresponding to the then angle of rotation of the center shaft 3 with the amount of displacement of the grinding wheel 5 measured by the measuring member 15, and generates the aforementioned pulse signals to operate the actuator 14. Movement of the actuator is transmitted through the interlocking member 11 and the reducing means 7–10 to move the carriage 6 and the grinding wheel 5 accordingly. Thus, mechanical errors attributable to the actuator, reducing means, etc. are all fed back to the control means 13 by the measuring member 15, whereby the workpiece 2 is fabricated into a predetermined aspheric configuration with ultra-high precision.

In the shown embodiment, the invention has been described with respect to a device for fabricating axially symmetric convex aspherics, whereas the invention may also be embodied in a device for fabricating axially symmetric concave aspherics on the same principle. Further, the shape or configuration of the grinding wheel may be suitably chosen in accordance with that of the workpiece. Still further, the measuring member for measuring the amount of displacement of the grinding wheel 5 may alternatively be a linear encoder or the like.

What I claimed is:

1. A device for fabricating a workpiece into an axially symmetric aspheric configuration, comprising:
   (a) means having a first axis for mounting thereon said workpiece and rotating said workpiece about said axis;
   (b) means having a second axis orthogonal to said first axis and for swinging said first axis so that said workpiece is swung within a predetermined angle about said second axis;
   (c) means for detecting the angle of swing of said workpiece about said second axis;
   (d) means for grinding said workpiece;
   (e) drive means for displacing said grinding means in a direction orthogonal to said second axis within a range permitting the grinding;
   (f) means for measuring the grinding position of said grinding means; and
   (g) means coupled to said detecting means and said measuring means for pre-memorizing, in accordance with said angle of swing, a predetermined position of each point on the aspheric configuration to be ground and for controlling said drive means so that said grinding position measured by said measuring means is equal to said memorized predetermined position.

2. A device according to claim 1, wherein the amount of drive of said drive means is determined in accordance with an input signal thereto, and said control means generates said signal.

3. A device according to claim 2, wherein said control means includes:
   a memory for said pre-memorizing;
   means for comparing the predetermined position memorized by said memory with said measured grinding position; and
   means for generating said signal for operating said drive means when there is a difference between said positions compared.

4. A device according to claim 3, wherein said drive means includes:
   a driving member for receiving the signal from said control means and causing a displacement in accordance with said signal;
   slidable means holding said grinding means at one end; and
   reducing means disposed between said driving member and said slidable means for reducing the displacement imparted by said driving member and for transmitting the reduced displacement to said slidable means.

5. A device according to claim 4, wherein said signal is a pulse signal and said driving member has a pulse motor operable in response to said pulse signal.

6. A device according to claim 1, further comprising means for securing said workpiece on said first axis at selected distances from said second axis.

7. A device for fabricating a workpiece into an axially symmetric aspheric configuration, comprising:
   (a) means having a first axis for mounting thereon said workpiece and rotating said workpiece about said axis;
   (b) means for grinding said workpiece;
   (c) means having a second axis orthogonal to said first axis for swinging said workpiece relative to said grinding means about said second axis;
   (d) means for detecting the angle of swing of said workpiece relative to said grinding means about said second axis;
   (e) drive means for displacing said grinding means relative to said workpiece in a direction orthogonal to said second axis within a range permitting the grinding;
   (f) means for measuring the grinding position of said grinding means relative to said workpiece; and
   (g) means coupled to said detecting means and measuring means for pre-memorizing, in accordance with said angle of swing, a predetermined position of each point on the aspheric configuration to be ground and for controlling said drive means so that said grinding position measured by said measuring means is equal to said memorized predetermined position.

* * * * *